US012212686B2

United States Patent
Chu et al.

(10) Patent No.: US 12,212,686 B2
(45) Date of Patent: Jan. 28, 2025

(54) DATA SECURITY MANAGEMENT METHOD, SYSTEM AND STORAGE MEDIUM FOR SMART CONTRACT BASED ON BLOCK CHAIN NETWORK

(71) Applicant: HEFEI YIWUYIZHENG TECHNOLOGY CO., LTD., Hefei (CN)

(72) Inventors: Dong Chu, Anhui (CN); Xinyu Wang, Anhui (CN); Rong Zhang, Anhui (CN); Li Zhao, Anhui (CN); Yayun He, Anhui (CN)

(73) Assignee: HEFEI YIWUYIZHENG TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 17/916,445

(22) PCT Filed: Aug. 5, 2021

(86) PCT No.: PCT/CN2021/110854
§ 371 (c)(1),
(2) Date: Sep. 30, 2022

(87) PCT Pub. No.: WO2022/267184
PCT Pub. Date: Dec. 29, 2022

(65) Prior Publication Data
US 2024/0214214 A1 Jun. 27, 2024

(30) Foreign Application Priority Data
Jun. 24, 2021 (CN) .......................... 202110701639.2

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01)

(58) Field of Classification Search
CPC ........................... H04L 9/3247; H04L 9/0825
USPC ........................................................ 713/176
See application file for complete search history.

(56) References Cited

U.S. PATENT DOCUMENTS 11,626,986 B1 * 4/2023 Horoszczak ............ H04L 9/088
705/51

* cited by examiner

*Primary Examiner* — Lan Dai T Truong
(74) *Attorney, Agent, or Firm* — McClure, Qualey & Rodack, LLP

(57) ABSTRACT

The present invention relates to the technical field of block chains, and discloses a data security management method, system and storage medium for smart contract based on block chain network, comprising storing information of at least one public key in asymmetric public and private keys synchronously when generating the smart contract; triggering a data management request, establishing block chain network communication, calling the smart contract to generate validation data, rendering timeliness management to the validation data, sending the same to a data management request end and calling at least one private key, signing the validation data, reorganizing the same with data to be managed and making corresponding management operations; data modifications caused by malicious attacks to data in the contract due to disclosure of the contract or other security defects are addressed, safety of data in the chains is efficiently promised and the present invention is of realistic utility value.

9 Claims, 2 Drawing Sheets

DATA SECURITY MANAGEMENT METHOD, SYSTEM AND STORAGE MEDIUM FOR SMART CONTRACT BASED ON BLOCK CHAIN NETWORK

TECHNICAL FIELD

The present invention relates to the technical field of block chains, and specifically a data security management method, system and storage medium for smart contract based on block chain network.

BACKGROUND TECHNOLOGY

In a block chain system, transaction logic can be separated from the underlying system and mechanism. The underlying system is in charge of basic functions such entering and validation of transaction blocks and consensus reaching among account managers, and what action is meant by transactions can be defined by secondary programming. Therefore, in the prior art, Ethereum Virtual Machines (EVM) that execute transaction codes are designed, wherein users can develop self-defined transaction logics, release the same on chains, and when conducting transactions, all nodes in the chains execute the same codes so as to change status of data on the chains synchronously. A smart contract in essence is a section of codes running in a block chain network and fulfilling business logics that users designate. Taking as an example ETHER in the Ethereum system, the business logic of the ETHER is to release and transact the ETHERs. At the very beginning of designing the Ethereum, a smart contract is designed as no change can be done when finalized. This design is to enhance credibility of the smart contract. However, we know that all programs written by human can have mistakes and errors. Smart contract is one of core technologies of block chains, and is a set of recognized rules in circumstances where multiple parties participate, and the smart contract is the center of value transmission. The reason why it becomes crucial if there is something wrong with security of block chains is that smart contract realizes value transmission, each number in the block chain is value, and huge losses can be behind digital changes caused by every flaw.

Furthermore, as credibility of existing smart contracts comes from the fact that it is not possible to tamper with the smart contracts, and once the smart contracts are executed it is not possible to make any modification. Anyone can attack security flaws existing in the contracts and in absence of corresponding protective measure, deterioration of security problems cannot be stopped, economical values of the contracts and trust of the public on the programs can be seriously damaged, in the meantime, many programs will disclose codes of the smart contracts. Disclosure and transparency of the source codes can improve trust of users to the contracts, however, it reduces for a large scale cost for hacking the system, every contract disclosed in an open network can be a gold mine and a target of professional hackers, and there are deficiencies in development processes of smart contracts, which start late and have experienced only a short development time so the smart contracts have genetic shortcomings; meanwhile, in the market professional technical staff are in short, artificial factors such as code reference, copying and modification can lead to bugs, and how to solve these problem makes it very important to manage the smart contract safely and efficiently.

SUMMARY OF INVENTION

Targeting at deficiencies of the prior art, the present invention provides a data security management method for smart contract based on block chains to solve the problem in the prior art that due to disclosure of contracts and other security bugs, data in smart contracts can be maliciously attacked, which results in changes of data. The present invention adopts the following technical solution:

A data security management method for smart contract based on block chains, comprising following steps:
  Storing information of at least one public-key in asymmetrical public and private key pairs synchronously in a smart contract when generating the smart contract;
  Triggering a data management request, establishing network communication between block chains, calling the smart contract to generate validation data, rendering timeliness management to the validation data and transmitting the same to a data management request end;
  Calling at least one private-key by the data management request end, signing the validation data, reorganizing the validation data with data to be managed and sending to the smart contract for execution and verification;
  Executing corresponding management actions to the data to be managed according to verification results, comprising specifically:
  Executing data status verification: when verification is not passed, terminating actions, otherwise, executing timeliness verification of the data;
  When timeliness verification of the data is failed, terminating the actions, otherwise, executing signature verification;
  When signature verification is failed, terminating the actions, otherwise executing tag verification of corresponding data in the contract; and
  When tag verification is failed, terminating the actions, otherwise conducting corresponding data management to the smart contract based on the data to be managed.

Preferably, the validation data comprise randomly generated codes;
Rendering timeliness management to the validation data is to provide time stamps and predetermined time thresholds for the codes currently generated in the smart contract.

Preferably, signature verification comprises:
Unsigncrypting signature data by calling the at least one public-key by the smart contract, comparing with the validation data stored locally, and completing verification.

Preferably, status verification of the validation data comprises reading status of the validation data stored in the smart contract, and when the validation data is not executed signature verification, the status verification is passed;
  Timeliness verification of the validation data comprises specifically:
  Reading the time stamps stored locally in the validation data, and conducting timeliness verification of the validation data based on data receiving time and the predetermined time thresholds.

Preferably, tag verification comprises specifically:
  Providing management tags for data in the smart contract, wherein the management tags comprise data management limits of authority, management times and time thresholds;
  After passing the signature verification, reading the data to be managed, locating the management tags of target data corresponding to the data to be managed in the smart contract;
  When the data management limits of authority in the management tags are forbidden, terminating the actions;
  Otherwise, reading the management times, when the time thresholds have been reached, terminating the actions, otherwise, executing renewing operations for the target data based on the data to be managed, and updating the management times in the management tags.

Preferably, the block chain network comprises: configuring and building the block chain network in a trusted execution environment with weakly centralized consortium block chain technologies or configuring and building the same with decentralized public block chain technologies.

The present invention further provides a data security management system for smart contract based on block chain network, comprising a data management terminal module, a block chain network, a smart contract module and a data tag storage module, wherein:

The data management terminal module is configured to record information regarding the at least one private key in the asymmetric public and private key pairs, send the data management request to the smart contract module, sign the smart contract when receiving the validation data generated by the smart contract module, and combine and encapsulate the data to be managed and transmit the same to the smart contract module;

The smart contract module is configured to receive the data management request, generate the validation data and transmit to a data management terminal, verify received signature data and executing corresponding management operations, comprising:

Executing status verification of the validation data: when the status verification is failed, terminating the actions, otherwise executing timeliness verification of the validation data;

When the timeliness verification is failed, terminating the actions, otherwise executing signature verification;

When the signature verification is failed, terminating the actions, otherwise executing tag verification for data corresponding to the contract;

When the tag verification is failed, terminating the actions, otherwise, conducting corresponding data management to the smart contract based on the data to be managed;

Wherein the data tag storage module is configured to provide and store management tags for data in the smart contract and the management tags comprise data management limits of authority, management times and time thresholds;

After passing the signature verification, reading the data to be managed, and locating the management tags of target data corresponding to the data to be managed in the smart contract;

When the data management limits of authority are forbidden, terminating the actions;

Otherwise, reading the management times, when the time thresholds have been reached, terminating the actions, otherwise executing renewing operations for the target data based on the data to be managed, and updating the management times in the management tags;

Preferably, the validation data generated by the smart contract module are randomly generated codes;

Wherein rendering timeliness management to the validation data is to provide time stamps and predetermined time thresholds for the codes currently generated.

Preferably, executing status verification for the validation data by the smart contract module is to read the status of the validation data stored in the smart contract, and when the validation data has not been given verification, the status verification is passed;

The timeliness verification of the validation data comprises specifically:

Reading the time stamps in the validation data stored locally, based on the data receiving time and the predetermined time thresholds, conducting timeliness verification of the validation data.

The present invention further provides a computer readable storage medium, wherein a data security management program for smart contract is stored in the computer readable storage medium, the security management program for the smart contract data can be executed by one or more processors to execute steps of the data security management method of smart contract based on block chain network as described.

Compared with the prior art, the present invention has the following beneficial effects:

In the present invention, information regarding managers of the smart contract is stored on chains, so that security of the information regarding managers is promised, important data and information in the contract are tagged for management, multiple layers of data protection mechanisms are used and most of malicious attacks can be eliminated; four data verification mechanisms have addressed data modifications resulted from malicious attacks to the contract data due to disclosure of the contract or other security flaws, security of data on the chains can be promised and the present invention is of realistic utility value;

Other outstanding substantive features and significant progress of the present invention compared with the prior art will be further elaborated in the embodiment part.

BRIEF DESCRIPTION OF DRAWINGS

By reading the detailed description made to the non-restrictive embodiments in conjunction with the following drawings, other features, purposes and advantages of the present invention will become more apparent.

EMBODIMENTS

Figure 1:
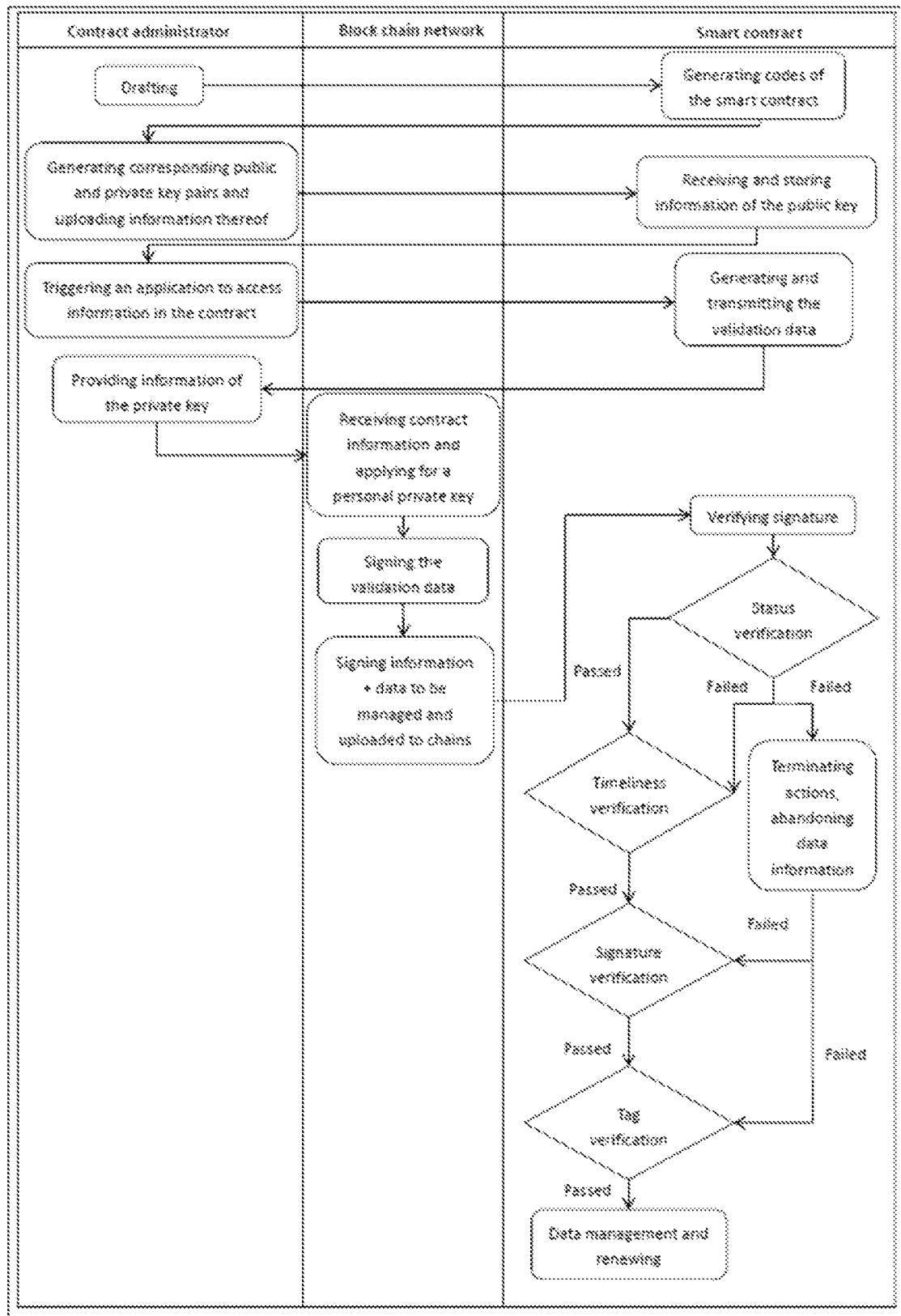
FIG. 1 is a flowchart diagram showing the data security management method of smart contract based on block chain network provided in embodiment 1.

The technical solutions in the embodiments of the present invention will be clearly and completely described below with reference to the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative efforts shall fall within the protection scope of the present invention.

It should be noted that certain names are used in the description and claims to refer to specific components. It should be understood that those of ordinary skill in the art may refer to the same component by different names. The description and claims of the present application do not take the difference in names as a way to distinguish components, but take the substantial differences in functions of the components as a criterion for distinguishing components. As used in the specification and claims of the present application, "comprising" or "including" is an open-ended term, which should be interpreted as "comprising but not limited to" or "including but not limited to". The embodiments described in the detailed description are preferred embodiments of the present invention, and are not intended to limit the scope of the present invention.

Furthermore, as would be appreciated by one skilled in the art, various aspects of the present invention may be embodied as a system, method or computer program product. Therefore, various aspects of the present invention may be embodied in the form of a combination of software and hardware, which may be collectively referred to herein as "circuits," "modules," or "systems." Furthermore, in some embodiments, various aspects of the present invention may also be implemented in the form of a computer program product in one or more microcontroller-readable media containing microcontroller-readable medium program codes.

It shall be noted in advance that targeting at security of smart contracts, usually measures are taken from three perspectives, namely, developing with security vaults, conducting contract test by security teams and contract verification, for example:

(1) Formal Verification

By formal verification, models are built for documents and codes of smart contracts with logical languages, and function correctness and security properties of the smart contracts are checked by undergoing precise mathematical inference logic and verification, which has overcome the problem that with conventional testing methods not all possible defects can be exhausted, runtime behaviors of codes can be fully covered, absolute correctness at a certain range can be guaranteed, limits of contract testing and contract verification work can be compensated, therefore, formal verification is preliminarily used in fields that safety matters a lot such as high speed trains, space industries and nuclear energies, and very good effects have been achieved.

Bhargavan et al have proposed a smart contract analysis and verification framework, wherein Solidity* and EVM* tools are used to convert source codes and bit codes of the smart contracts to be functional programming language F* so as to analyze and verify security and functional correctness during runtime of the contracts. Currently, tools such as Coq, Isabelle/HOL and Why3 have also realized semantic notation of EVM, and have also done some formal verification work for smart contracts.

(2) Fuzz Testing

Fuzz testing is a method to detect faults of software by constructing unexpected input data and monitoring abnormal results of target software during runtime. When conducting fuzz testing to smart contracts, a large quantity of random data are generated by a fuzzer, executable transactions are formed, with reference to feedbacks of testing results, the fuzzer adjusts dynamically data generated so as to explore status space of the smart contracts as much as possible. Status of each transaction is analyzed based on a finite-state machine to detect whether there is threat of attacking. An automation tool Echidna uses fuzz testing technologies to test bit codes of EVM, however, stability of API functions cannot be promised.

(3) Symbolic Execution

A core spirit of symbolic execution is to use symbolic values to replace specific values to execute a program. Variants of any indefinite value during analysis processes of the program including environment variants and inputs can be replaced by symbolic values. "Execution" in symbolic execution means to analyze instructions on a program executable path and renew program execution status semantically, which can be interpreted that a general process for executing smart contract vulnerability identification by symbolic values is, first of all, to symbolize variants of uncertain values in the smart contract as necessary, explain instructions in the execution program one by one, renew execution status and collect path constraints during execution explanation, and conduct fork execution at nodes of branches so as to complete exploration of all executable paths and identify security issues. Constraint solving techniques can be used to solve path constraints collected during symbolic execution, judge whether the path can be reached, and detect whether a value of a detection variant at a specific program point conform with stipulations regarding security of the program or satisfy conditions for a failure to exist.

(4) Taint Analysis

In essence, taint analysis is a data stream analysis technology targeting at tainted variables. A general process of taint analysis is: first of all, to identify a generation point of tainted information in a smart contract and label the same; then conduct a forward or backward data dependency analysis according to actual requirements and taint spreading rules, obtain an instruction set of data dependency and being dependent relationships of the taints; and finally check whether key operations will be influenced by the tainted information at key program points.

When there is at least one defect in a smart contract to be repaired, data in the contract shall be managed and renewed correspondingly, and on this basis, the present invention designs contents of the following embodiments.

Embodiment 1

As shown in FIG. 1, a data security management method of smart contracts based on block chain network, comprises the following steps:

Depositing information of at least one public key in asymmetric public and private key pairs synchronously when generating a smart contract;

Triggering a data management request, establishing communication in the block chain network; calling the smart contract to generate validation data, rendering timeliness management to the validation data and sending the validation data to a data management request end; in the present embodiment, the validation data are codes randomly generated, the codes are irregular, and rendering timeliness management to the validation data comprises specifically providing time stamps in the codes currently generated and presetting time thresholds;

Calling at least one private key by the data management request end, signing the validation data, regrouping with data to be managed and sending to the smart contract for verification;

Executing corresponding management actions to the data to be managed according to verification results, comprising specifically:

Executing status verification for the validation data; when the status verification is failed, terminating the actions, otherwise executing timeliness verification for the validation data; wherein the status verification for the validation data comprises reading status of the validation data stored in the smart contract, when the validation data is not executed verification, the status verification is passed, when verification has already been executed, terminating the actions, so that repeated attacks happened when signature contents and original signature information of the at least one private key have been intercepted by others can be stopped and randomness and disposability of the verification codes in the block chains can maintained.

The timeliness verification comprises specifically:

Reading the time stamps in the validation data and conducting timeliness verification of the validation data based on data receiving time and predetermined time thresholds; when other data signed by private keys for public keys not in the smart contract or unsigned data attack the smart contract maliciously, the data are disposed at the first protection step—status verification, data in the contract will not respond;

Where the timeliness verification of the validation data is not passed, terminating the actions, otherwise, executing signature verification; wherein signature verification comprises specifically:

Calling the at least one public key to unsigncrypting inputted signature data by the smart contract, comparing with the validation data stored locally, and completing verification;

When the signature verification is not passed, terminating the actions, otherwise, conducting corresponding data management to the smart contract based on the data to be managed, wherein in the present embodiment tag verification comprises specifically:

Providing management tags for the data in the smart contract, wherein the management tags comprise data management limits of authority, management times and time thresholds;

When the signature verification is passed, reading the data to be managed, locating the management tags of target data corresponding to the data to be managed in the smart contract;

When the data management limits of authority in the management tags are forbidden, terminating the operations;

Otherwise, reading the management times, when the time thresholds have been met terminating the actions, otherwise, executing renewing operations for the target data based on the data to be managed and renewing the management times in the data management tags; commonly the management times can be configured to be 1, that is a management and renewing method that original information can be added for only one time in the smart contract, when the user loses the private key after uploading the data for the first time, and a second person renews information in the contract by the private key, design of the present embodiment protects data security and ensures that data from the original data owner will not be renewed for a second time, data security can be promised, which will not be backdated here;

In the prior art, by authorization of the private key from the owner, renewal of the data in the smart contract can be done, however, in reality, private key keeping mechanism of users is not perfect, the private key is liable to be lost or stolen; one the private key is stolen, security of the contract cannot be promised, in the present embodiment, tags can be provided for important information that cannot be changed once uploaded in the chains so that classified and categorized management of the data in the smart contract can be realized.

By cooperation of the management tags, the timeliness verification and the signature verification, multiple protections to the data to be managed can be realized.

In the present embodiment, the block chain network comprises: building the block chain network in a trusted execution environment by weakly centralized consortium block chain technologies or building the same with decentralized public block chain technologies.

Embodiment 2

Figure 2:
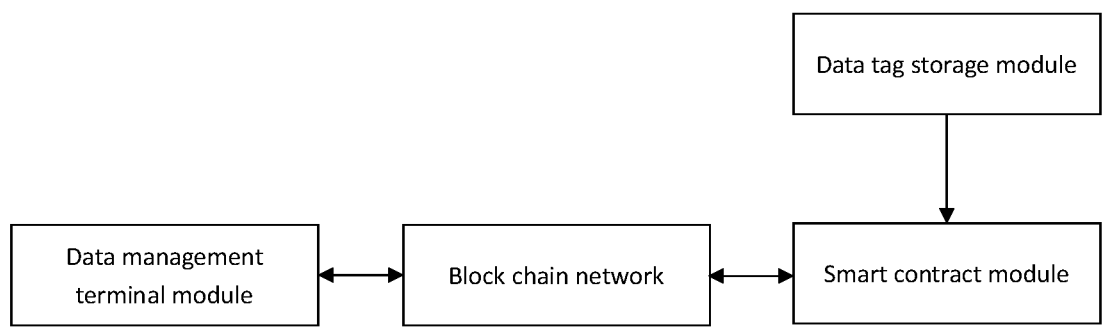
FIG. 2 is a structural diagram showing the data security management system of smart contract based on block chain network provided in embodiment 2.

As shown in FIG. 2, the present embodiment provides a symmetric encrypted traceable transaction system based on block chain network, comprising a data management terminal module, a block chain network, a smart contract module and a data tag storage module, wherein The data management terminal module is configured to record information of at least one private key in asymmetric public and private key pairs, and send at least one data management request to the smart contract module, sign validation data after receiving the validation data generated by the smart contract module, pack and encapsulate the data to be managed and transmit the same to the smart contract module;

The smart contract module is configured to receive the at least one data management request, generate the validation data and transmit to the data management terminal, and verify signature of received signature data and execute corresponding management operations, comprising:

Executing status verification for the validation data: when the status verification is failed, terminating the operations, otherwise, executing timeliness verification for the validation data;

When the timeliness verification of the validation data is failed, terminating the actions, otherwise, executing tag verification for the data in the smart contract;

When the tag verification is failed, terminating the actions, otherwise conducting corresponding data management to the smart contract based on the data to be managed;

Wherein the data tag storage module is configured to provide and store management tags for the data in the smart contract, wherein the management tags comprise the data management limits of authority, management times and time thresholds;

When the signature verification is passed, reading the data to be managed, locating target data management tags in the smart contract corresponding to the data to be managed;

When the data management limits of authority in the management tags are forbidden, terminating the actions;

Otherwise, reading the management times, when the time thresholds are reached, terminating the actions, otherwise executing renewing operations for the target data based on the data to be managed, and renewing the management times in the management tags.

In the present embodiment, the validation data generated by the smart contract module are randomly generated codes;

Wherein rendering the timeliness verification to the validation data comprises providing time stamps and predetermined time thresholds for the code currently generated.

In the present embodiment, executing status verification of the validation data by the smart contract module comprises reading status of the validation data stored in the smart contract, and when the validation data has not been given verification, the status verification is passed;

Wherein the timeliness management of the validation data comprises specifically:

Reading the time stamps in the validation data stored locally, and conducting timeliness verification of the validation data based on the data receiving time and the predetermined time thresholds.

Embodiment 3

A computer readable storage medium, wherein a data security management program for smart contracts is stored on the computer readable storage medium, wherein the data security management program for smart contracts can be executed by one or more processors to realize steps of the data security management method for smart contract based on block chain network as defined in embodiment 1.

Those of ordinary skill in the art can realize that units and algorithm steps of each example described in conjunction with the embodiments disclosed herein can be implemented by electronic hardware, or a combination of computer software and electronic hardware. Whether these functions are performed in hardware or software depends on specific application and design constraints of the technical solution. Those skilled in the art may implement the described functionality using different methods for each particular application, but such implementations should not be considered beyond the scope of the present invention.

Those skilled in the art can clearly understand that, for the convenience and brevity of description, the specific working process of the above-described system, device and unit may refer to corresponding processes in the foregoing method embodiment, which will not be repeated here.

In view of the several embodiments provided in the present invention application, it should be understood that the disclosed system, apparatus and method may be implemented in other manners. For example, the apparatus embodiments described above are only illustrative. For example, division of the units is made from the perspective of logical function division. In actual implementation, there may be other division methods. For example, multiple units or components may be combined or integrated into another system, or some features can be ignored, or not implemented. On the other hand, mutual coupling or direct coupling or communication shown or discussed here may be realized through some interfaces, indirect coupling or communication of devices or units, and may be in electrical, mechanical or other forms.

The units described as separate components may or may not be physically separated, and components shown as units may be or may not be physical units, that is, may be located in one place. Alternatively, it can be distributed over multiple network elements. Some or all of the units may be selected according to actual needs to achieve the purpose of the technical solution in the present embodiment.

In addition, each functional unit in each embodiment of the present invention may be integrated into one processing unit, or each unit may exist physically alone, or two or more units may be integrated into one unit.

The functions, if implemented in the form of software functional units and sold or used as independent products, may be stored in a computer-readable storage medium. Based on such understanding, in essence, the technical solution or parts that contribute to the prior art or parts of the technical solution of the present invention can be embodied in the form of a software product. The computer software product is stored in a storage medium, including several instructions used to cause a computer device (which may be a personal computer, a server, or a network device, etc.) to execute all or part of the steps of the method described in the various embodiments of the present invention.

The aforementioned storage medium includes: a U disk, a mobile hard disk, a read-only memory (ROM, Read-Only Memory), random access memory (RAM, Random, Access, Memory), magnetic disk or optical disk and other media that can store program verification codes.

It will be apparent to those skilled in the art that the present invention is not limited to the details of the above-described exemplary embodiments, but that the present invention may be embodied in other specific forms without departing from the spirit or essential characteristics of the invention. Therefore, the embodiments are to be regarded in all respects as illustrative and not restrictive, and the scope of the invention is to be defined by the appended claims rather than the foregoing description, and all changes that fall within contents and scope of equivalent parts of the claims are included in the present invention. Any reference signs in the claims shall not be construed as limiting the involved claim.

In addition, it should be understood that although this specification is described in terms of embodiments, not each embodiment only includes an independent technical solution, and the description in the specification is only for the sake of clarity, and those skilled in the art should take the specification as a whole, the technical solutions in each embodiment can also be appropriately combined to form other implementations that can be understood by those skilled in the art.

The invention claimed is:

1. A data security management method for a smart contract based on block chains, comprising following steps:
    storing information of at least one public-key in asymmetrical public and private key pairs synchronously in a smart contract when generating the smart contract;
    triggering a data management request, establishing network communication between block chains, calling the smart contract to generate validation data, rendering timeliness management to the validation data and transmitting the same to a data management request end;
    calling at least one private-key by the data management request end, signing the validation data, reorganizing the validation data with data to be managed and sending to the smart contract for execution and verification;
    executing corresponding management actions to data to be managed according to verification results, comprising specifically:
    executing data status verification: when verification is not passed, terminating actions, otherwise, executing timeliness verification of the data;
    when timeliness verification of the data is failed, terminating the actions, otherwise, executing signature verification;
    when signature verification is failed, terminating the actions, otherwise executing tag verification of corresponding data in the smart contract; and
    when tag verification is failed, terminating the actions, otherwise conducting corresponding data management to the smart contract based on the data to be managed.

2. The data security management method for smart contract based on block chains according to claim 1, wherein the validation data comprise randomly generated codes;
    rendering timeliness management to the validation data is to provide time stamps and predetermined time thresholds for the codes currently generated in the smart contract.

3. The data security management method for smart contract based on block chains according to claim 2, wherein signature verification comprises:

unsigncrypting signature data by calling the at least one public-key by the smart contract, comparing with the validation data stored locally, and completing verification.

4. The data security management method for smart contract based on block chains according to claim 3, wherein status verification of the validation data comprises reading status of the validation data stored in the smart contract, and when the validation data is not executed signature verification, the status verification is passed;
timeliness verification of the validation data comprises specifically:
reading the time stamps stored locally in the validation data, and conducting timeliness verification of the validation data based on data receiving time and the predetermined time thresholds.

5. The data security management method for smart contract based on block chains according to claim 4, wherein tag verification comprises specifically:
providing management tags for data in the smart contract, wherein the management tags comprise data management limits of authority, management times and time thresholds;
after passing the signature verification, reading the data to be managed, locating the management tags of target data corresponding to the data to be managed in the smart contract;
when the data management limits of authority in the management tags are forbidden, terminating the actions;
otherwise, reading the management times, when the time thresholds have been reached, terminating the actions, otherwise, executing renewing operations for the target data based on the data to be managed, and updating the management times in the management tags.

6. The data security management method for smart contract based on block chains according to claim 5, wherein the block chain network comprises: configuring and building a block chain network in a trusted execution environment with weakly centralized consortium block chain technologies or configuring and building the same with decentralized public block chain technologies.

7. A data security management system for smart contract based on block chain network, comprising a data management terminal module, a block chain network, a smart contract module and a data tag storage module, wherein:
the data management terminal module is configured to record information regarding at least one private key in the asymmetric public and private key pairs, send a data management request to the smart contract module, sign the smart contract when receiving validation data generated by the smart contract module, and combine and encapsulate data to be managed and transmit the same to the smart contract module;
the smart contract module is configured to receive the data management request, generate the validation data and transmit to a data management terminal, verify received signature data and executing corresponding management operations, comprising:
executing status verification of the validation data: when the status verification is failed, terminating actions, otherwise executing timeliness verification of the validation data;
when the timeliness verification is failed, terminating the actions, otherwise executing signature verification;
when the signature verification is failed, terminating the actions, otherwise executing tag verification for data corresponding to the smart contract;
when the tag verification is failed, terminating the actions, otherwise, conducting corresponding data management to the smart contract based on the data to be managed;
wherein the data tag storage module is configured to provide and store management tags for data in the smart contract and the management tags comprise data management limits of authority, management times and time thresholds;
after passing the signature verification, reading the data to be managed, and locating the management tags of target data corresponding to the data to be managed in the smart contract;
when the data management limits of authority are forbidden, terminating the actions;
otherwise, reading the management times, when the time thresholds have been reached, terminating the actions, otherwise executing renewing operations for the target data based on the data to be managed, and updating the management times in the management tags.

8. The data security management system for smart contract based on block chain network according to claim 7, wherein the validation data generated by the smart contract module are randomly generated codes;
wherein rendering timeliness management to the validation data is to provide time stamps and predetermined time thresholds for the codes currently generated.

9. The data security management system for smart contract based on block chain network according to claim 8, wherein executing status verification for the validation data by the smart contract module is to read the status of the validation data stored in the smart contract, and when the validation data has not been given verification, the status verification is passed;
the timeliness verification of the validation data comprises specifically:
reading the time stamps in the validation data stored locally, based on the data receiving time and the predetermined time thresholds, conducting timeliness verification of the validation data.

* * * * *